United States Patent
Carlstedt et al.

(10) Patent No.: US 6,585,275 B1
(45) Date of Patent: Jul. 1, 2003

(54) ASSEMBLY FOR ADJUSTING ROLL RATE RESPONSIVE TO CHANGING STEERING ANGLE

(75) Inventors: Robert P. Carlstedt, Rochester Hills, MI (US); James B. Chamberlin, Charlotte, NC (US); Ragnar H. Ledesma, Sterling Heights, MI (US); Nancy L. Saxon, Oakland Township, MI (US); Dennis A. Kramer, Troy, MI (US); Doyle R. Downey, Beverly Hills, MI (US); Joseph Cubalchini, St. Charles, IL (US); Monte G. Williams, Royal Oak, MI (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 10/023,251

(22) Filed: Dec. 17, 2001

(51) Int. Cl.$^7$ ................................................ B60G 21/05
(52) U.S. Cl. ............................ 280/124.106; 280/124.152
(58) Field of Search .................. 280/124.106, 124.107, 280/124.149, 124.152, 5.511, 5.512, 5.515, 5.51

(56) References Cited

U.S. PATENT DOCUMENTS

| 5,511,817 | A |   | 4/1996  | Kasahara et al.              |
|-----------|---|---|---------|------------------------------|
| 5,882,017 | A | * | 3/1999  | Carleer .............. 280/5.508 |
| 5,938,219 | A |   | 8/1999  | Hayami et al.                |
| 6,193,250 | B1| * | 2/2001  | Woo ................. 280/124.107 |
| 6,467,783 | B1| * | 10/2002 | Blondelet et al. ..... 280/124.106 |

* cited by examiner

Primary Examiner—Paul N. Dickson
Assistant Examiner—Faye M. Fleming
(74) Attorney, Agent, or Firm—Carlson, Gaskey & Olds

(57) ABSTRACT

An assembly for use as part of a vehicle suspension system includes an adjustable roll rate that is automatically adjusted responsive to maneuvers of the vehicle. A stiffener element is coupled with a stabilizer bar. The stiffener element increases the roll rate responsive to the vehicle wheels being turned. In one example, the stiffener element is a metallic plate that rotates into various positions responsive to the vehicle wheel being turned. The further the wheel turns, the further the plate rotates and the greater the increase in the roll rate.

14 Claims, 1 Drawing Sheet

ASSEMBLY FOR ADJUSTING ROLL RATE RESPONSIVE TO CHANGING STEERING ANGLE

BACKGROUND OF THE INVENTION

This invention generally relates to vehicle suspension systems and more particularly, to a system that increases roll rate responsive to the wheels of the vehicle being turned.

Modern day vehicle suspensions include a variety of components that are intended to make the vehicle ride as comfortable as possible while providing safe travel. Example components include shock absorbers at each of the wheels and stabilizer bars extending across a vehicle between wheels. The stabilizer bars effectively couple the vehicle ride and roll performance. Stabilizer bars are useful for preventing vehicle body roll during turns. Stabilizer bars, however, also add an unwanted spring rate to the suspension when one vehicle wheel encounters a road surface that is different than that encountered by the other wheel. For example, if one wheel hits a bump while the other does not, the spring rate on the wheel that hits the bump increases because of the stabilizer bar. The increased spring rate reduces ride comfort. While stabilizer bars are useful, it is desirable to modify their performance to address the competing needs for stability and ride comfort.

Adjusting the roll rate has been done in the racing industry. In those arrangements, a driver manually adjusts the roll rate to accommodate different fuel levels or other factors affecting the race car handling. There has not been an automatically adjustable arrangement nor one that changes the roll rate to accommodate the competing needs for stability and comfort.

Accordingly, there is a need for an arrangement where the performance of the stabilizer bar is enhanced under conditions where the roll rate must be at a certain level while the stabilizer bar performance can be effectively reduced when the roll rate can be relatively lower. This invention provides such an arrangement in a way that effectively couples the roll rate to the steering angle of the vehicle wheels, which has not been done before.

SUMMARY OF THE INVENTION

In general terms, this invention is an assembly for use in a vehicle suspension system that automatically adjusts the roll rate. A first element of the assembly rotates about a steering axis as an associated wheel on the vehicle is turned. A stabilizer bar is supported on the vehicle to counteract forces on the vehicle that otherwise tend to cause the vehicle to roll during a turn. A stiffness element is coupled with the stabilizer bar and automatically adjusts a stiffness of the assembly responsive to the first element rotating.

In one example the stiffness element is a metallic plate that is mechanically linked with a knuckle associated with the vehicle suspension at a corresponding wheel. The mechanical linkage provides that whenever the knuckle rotates about a steering axis, the plate rotates from a first orientation into a second orientation so that the roll rate is increased as the steering angle of the wheel assembly increases.

The various features and advantages of this invention will become apparent to those skilled in the art from the following detailed description of the currently preferred arrangement. The drawings that accompany the detailed description can be briefly described as follows.

DETAILED DESCRIPTION OF THE PREFERRED EMBODIMENTS

Figure 1:
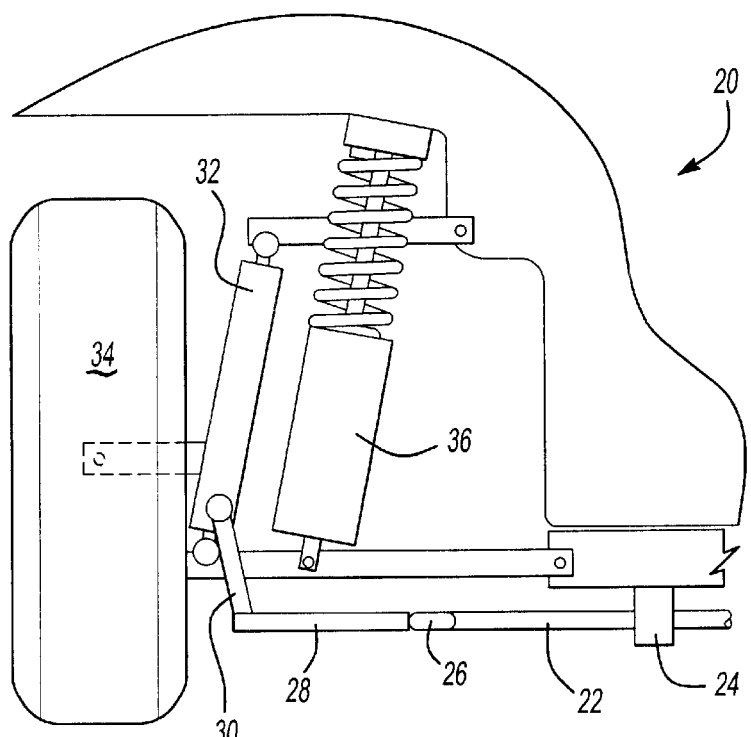
FIG. 1 schematically illustrates an assembly designed according to this invention.

A vehicle suspension assembly 20 includes a stabilizer bar 22 that is supported on a vehicle using conventional support elements 24. As known in the art, stabilizer bars are often supported on the vehicle utilizing a bushing and clamp arrangement. One end of the stabilizer bar 22 is coupled through a linkage 26 with a stiffener element 28. In the illustrated example, the stiffener element 28 is a generally flat, metallic plate.

An opposite end of the stiffener element 28 preferably is mechanically linked by a linkage 30 to a knuckle 32 of the suspension arrangement. The knuckle 32 rotates about a steering axis (not illustrated) as the vehicle wheel 34 is turned during a driving maneuver.

In another example, the linkage 30 couples the stiffener element 28 to a strut body 36, which rotates as the wheel 34 is turned.

The linkages 26 and 30 provide for the stiffener element 28 to adjust the roll rate responsive to the wheel 34 being turned. In the illustrated example, the linkages 30 and 26 cause the plate 28 to rotate about its own axis as the wheel 34 is turned and the knuckle 32 rotates about the steering axis. The axis of the plate 28 in the illustrated example is aligned with an axis of the stabilizer bar 22. Other orientations are possible within the scope of this invention. As the steering angle increases, the plate 82 preferably continues to rotate.

By linking the roll rate to the steering angle, this invention provides a unique solution that allows for the roll rate to be at a lower level when the vehicle is traveling in a straight line. During turns or other vehicle maneuvers, the roll rate is increased to provide the desired amount of stiffness. In this manner, the roll rate is automatically adjusted responsive to changes in the steering angle of at least one of the vehicle wheels.

Altering the orientation of the stiffener element 28 adjusts the roll rate. In the example where the stiffener element 28 is a metallic plate or blade, the blade stiffness will vary with the orientation of the blade relative to the other suspension assembly components. In the illustrated example, the roll rate is lowest when the blade 28 is in a horizontal position. As the blade rotates toward a vertical orientation, the roll rate increases.

Figure 2:
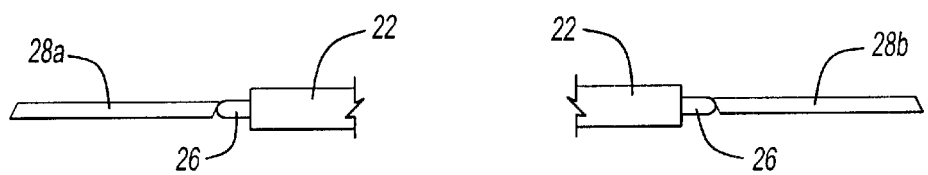
FIG. 2 schematically illustrates selected components of an assembly designed according to this invention in a first position.
Figure 3:
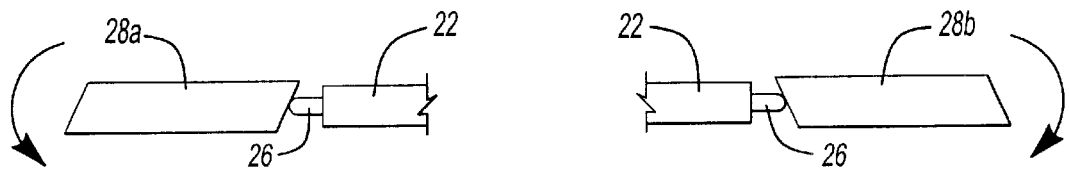
FIG. 3 illustrates the example of FIG. 2 in a second position.
Figure 4:
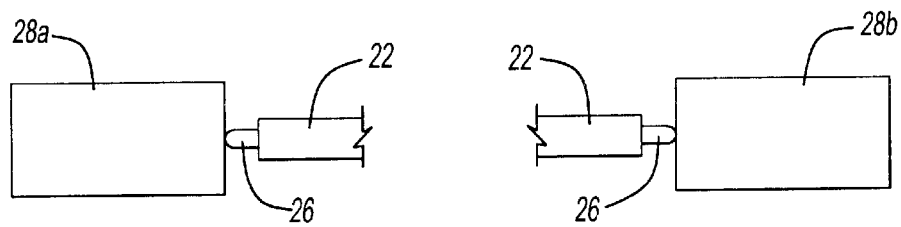
FIG. 4 illustrates the components of the example of FIGS. 2 and 3 in a third operating position.

FIG. 2 illustrates an example arrangement where two stiffener elements 28a and 28b are provided at opposite ends of the stabilizer bar 22. As shown in FIG. 2, the plates are generally horizontal when the wheels are aligned to drive straight. As the vehicle wheels are turned, the plates 28a and 28b rotate toward a vertical orientation. As illustrated in FIG. 3, the plates preferably rotate in an opposite direction although at an equal amount in one example. FIG. 4 shows the plates in a fully rotated position, which may be vertical, depending on the needs of a particular situation.

In one example, one plate 28 is utilized and coupled with one end of the stabilizer bar 22. In this example, the preferred operating range of orientations for the plate is from 0° at horizontal to a fully vertical position, which represents a 90° rotation. The linkages 30 and 26 preferably operate to rotate the blade 28 in one direction during a right hand steer while causing the blade to rotate in an opposite direction in a left hand steer.

Those skilled in the art who have the benefit of this description will be able to design and arrange appropriate components for the linkages 26 and 30. Examples include wires, cams or gears for causing the plate 28 to rotate as the steering angle changes. Provided that the stiffener element 28 rotates responsive to rotation of the knuckle (or another selected component) turning as the vehicle wheel is turned, the results provided by this invention will be achieved. Those skilled in the art who have the benefit of this description will likewise be able to select the appropriate material composition and thickness of the plate 28 and the desired orientation of the plate to correspond to the various steer angles that will be encountered during vehicle maneuvers. The criteria for different vehicles under different conditions will be able to be determined by those skilled in the art.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An assembly for use as part of a vehicle suspension system, comprising:
    a first element that rotates about a steering axis as an associated wheel is turned;
    a stabilizer bar that is supported on the vehicle to counteract forces on the vehicle that otherwise tend to cause the vehicle to roll during a turn; and
    a stiffness element that is coupled with the stabilizer bar and automatically adjusts a stiffness of the assembly responsive to the first element rotating.

2. The assembly of claim 1, wherein the adjustable stiffness element comprises a metal plate.

3. The assembly of claim 2, wherein the plate rotates from a first orientation into a second orientation as the first element rotates.

4. The assembly of claim 3, wherein the plate is generally horizontal when the first element is in an orientation corresponding to the wheel not being turned and the plate progressively rotates toward a vertical orientation as the first element progressively turns.

5. The assembly of claim 1, wherein the first element is mechanically linked with a first end of the stiffness element and the stabilizer bar is mechanically linked with a second end of the stiffness element.

6. The assembly of claim 1, wherein the stiffness element provides a first stiffness level when the first element is in an orientation corresponding to the wheel being straight and an increasing stiffness level as the first element rotates as the wheel is turned.

7. The assembly of claim 1, including a second element that rotates about a steering axis as a corresponding wheel is turned and a second stiffness element coupled to the stabilizer bar, the second stiffness element adjusting a stiffness of the assembly responsive to the second element rotating.

8. The assembly of claim 7, wherein the stiffness elements each comprises metal plates and wherein the metal plates are coupled to the stabilizer bar near opposite ends of the stabilizer bar.

9. The assembly of claim 8, wherein the stiffness elements are generally horizontal when the wheels are straight and the stiffness elements move in opposite directions toward a vertical orientation as the first and second elements rotate as the wheels are turned.

10. An assembly for use in a vehicle suspension, comprising:
    a stabilizer bar that is supported to counteract forces that otherwise tend to cause the vehicle to roll during a turn; and
    at least one metal plate coupled with the stabilizer bar, the metal plate moving from a first orientation when the vehicle is moving in a generally straight line into a second orientation responsive to an associated vehicle wheel turning, the metal plate increasing a roll rate associated with the stabilizer bar as the plate moves from the first orientation into the second orientation.

11. The assembly of claim 10, including a second metal plate and wherein the metal plates are coupled with the stabilizer bar near opposite ends of the bar.

12. The assembly of claim 11, wherein the metal plates are generally horizontal in the first orientation and wherein the plates move in opposite directions toward a vertical orientation as the vehicle wheels are turned.

13. The assembly of claim 10, including a strut associated with the vehicle wheel such that the strut rotates as the wheel is turned and wherein one end of the plate is associated with the strut such that the plate orientation changes as the strut rotates and a second end of the plate is coupled with the stabilizer bar.

14. The assembly of claim 10, including a knuckle associated with the vehicle wheel such that the knuckle rotates as the wheel is turned and wherein one end of the plate is associated with the knuckle such that the plate orientation changes as the knuckle rotates and a second end of the plate is coupled with the stabilizer bar.

* * * * *

UNITED STATES PATENT AND TRADEMARK OFFICE
CERTIFICATE OF CORRECTION

PATENT NO.    : 6,585,275 B1
DATED         : July 1, 2003
INVENTOR(S)   : Robert P. Carlstedt et al.

It is certified that error appears in the above-identified patent and that said Letters Patent is hereby corrected as shown below:

<u>Title page,</u>
Item [75], Inventors, should read -- Joseph Cubalchini Jr., St. Charles, IL (US) --
Item [*] Notice, should read -- Subject to any disclaimer, the term of this patent is extended or adjusted under 35 U.S.C. 154(b) by 24 days. --

Signed and Sealed this

Twenty-first Day of October, 2003

JAMES E. ROGAN
*Director of the United States Patent and Trademark Office*